(12) United States Patent
Song

(10) Patent No.: US 12,330,938 B2
(45) Date of Patent: Jun. 17, 2025

(54) NG PYROLYSIS SYSTEM AND METHOD FOR CONTROLLING SAME

(71) Applicants: Hyundai Motor Company, Seoul (KR); Kia Corporation, Seoul (KR)

(72) Inventor: Han Eol Song, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 765 days.

(21) Appl. No.: 17/694,943

(22) Filed: Mar. 15, 2022

(65) Prior Publication Data
US 2022/0396478 A1 Dec. 15, 2022

(30) Foreign Application Priority Data
Jun. 11, 2021 (KR) .................. 10-2021-0076138

(51) Int. Cl.
*C01B 3/24* (2006.01)
*C01B 3/50* (2006.01)

(52) U.S. Cl.
CPC .............. *C01B 3/24* (2013.01); *C01B 3/508* (2013.01); *C01B 2203/0266* (2013.01); *C01B 2203/043* (2013.01); *C01B 2203/0827* (2013.01); *C01B 2203/0883* (2013.01); *C01B 2203/1241* (2013.01); *C01B 2203/1604* (2013.01)

(58) Field of Classification Search
None
See application file for complete search history.

(56) References Cited

U.S. PATENT DOCUMENTS

| | | | | |
|---|---|---|---|---|
| 8,853,485 | B2 * | 10/2014 | Zhang | ................. C07C 7/11 585/854 |
| 2012/0161451 | A1 * | 6/2012 | Struble | .................. C10K 1/002 422/600 |
| 2018/0194626 | A1 * | 7/2018 | Berggren | ................. E21C 51/00 |
| 2023/0134082 | A1 * | 5/2023 | DeBruin | .................. C01B 3/36 252/373 |

FOREIGN PATENT DOCUMENTS

KR 10-2009-0084844 A 8/2009

* cited by examiner

*Primary Examiner* — John J Figueroa
(74) *Attorney, Agent, or Firm* — Morgan, Lewis & Bockius LLP

(57) ABSTRACT

A cooler installed to cool NG supplied from a compressor to a pyrolysis reactor and configured to independently use multiple refrigerants is provided; a first refrigerant supply device provided to supply a first refrigerant for the cooler; and a second refrigerant supply device configured to supply, to the cooler, a fuel gas for a burner, including an off-gas and NG which has not passed through the compressor, as a second refrigerant for the cooler.

10 Claims, 4 Drawing Sheets

FIG. 4

| Valve | Cooler cooling load (@100% load) | Valve open rate (cooling load) | | |
|---|---|---|---|---|
| | | Operation mode1 (Load @ 0~40% Initial starting operation) | Operation mode2 (Load @ 40% Switch Over) | Operation mode3 (Load @ 40~100%, Normal operation) |
| Cooling water valve | 60% | 0→96%(96%) | 84%(84%) | 84→60%(60%) |
| Off-gas valve | 30% | 0% | 100%(0~12%) | 100%(12~30%) |
| NG valve | 10% | 0→40%(4%) | 40%(4%) | 40→100%(4~10%) |

NG PYROLYSIS SYSTEM AND METHOD FOR CONTROLLING SAME

CROSS REFERENCE TO RELATED APPLICATION

The present application claims priority to Korean Patent Application No. 10-2021-0076138, filed Jun. 11, 2021, the entire contents of which is incorporated herein for all purposes by this reference.

TECHNICAL FIELD

The present disclosure relates to a technology regarding a system for pyrolyzing natural gas (NG) such that hydrogen is produced.

BACKGROUND

A NG pyrolysis system is configured to compress NG by a compressor and to supply the same to a pyrolysis reactor. In order to maintain the temperature of NG supplied to the pyrolysis reactor at a constant level, a cooler is provided between the compressor and the pyrolysis reactor.

According to the prior art, the cooler is configured to lower the temperature of passing NG commonly by using cooling water, and heat removed from the NG is discarded as waste heat by a cooling tower or the like.

The above descriptions regarding background technologies have been made only to help understanding of the background of the present disclosure, and are not to be deemed by those skilled in the art to correspond to already-known prior arts, and should not be taken as acknowledgment that this information forms any part of prior art.

SUMMARY

It is an aspect of the present disclosure to provide a NG pyrolysis system and a method for controlling the same, wherein during a process of compressing NG and supplying the same to a pyrolysis reactor, heat generated as a result of compressing the NG is used more efficiently, thereby reducing the flow rate of NG supplied to a burner, and improving the overall process efficiency of the NG pyrolysis system.

In accordance with an aspect of the present disclosure, a NG pyrolysis system includes: a cooler installed to cool NG supplied from a compressor to a pyrolysis reactor and configured to independently use multiple refrigerants; a first refrigerant supply device configured to supply a first refrigerant for the cooler; and a second refrigerant supply device configured to supply, to the cooler, a fuel gas for a burner, including an off-gas and NG which has not passed through the compressor, as a second refrigerant for the cooler.

The first refrigerant supply device may include: a cooling water valve configured to supply cooling water to the cooler; and a cooling tower configured to dissipate heat from the cooling water that has passed through the cooler.

The cooling water valve may be configured to feed back a temperature of NG, which passes through the compressor and is supplied to the pyrolysis reactor, to adjust a flow rate of cooling water.

The second refrigerant supply device may include: an off-gas valve configured to supply, to the cooler, an off-gas discharged from a pressure swing adsorption (PSA) configured to adsorb and extract only hydrogen from a synthesis gas reacted in the pyrolysis reactor; and a NG valve configured to supply, to the cooler, NG which is supplied from a NG supply source and does not pass through the compressor.

An off-gas and NG, which have passed through the cooler, may be configured to be supplied as a fuel for the burner.

The NG valve may be configured to feed back a temperature inside the burner to adjust a flow rate of NG supplied to the cooler.

In accordance with another aspect of the present disclosure, a NG pyrolysis system control method may include: performing control in a predetermined first operation mode, when starting a NG pyrolysis system, in which only cooling water and NG are supplied as a refrigerant for cooling a cooler until a burner and a pyrolysis reactor operate and a PSA starts to discharge an off-gas; performing control in a predetermined second operation mode, when the PSA starts to discharge the off-gas, in which the off-gas is supplied to the cooler as much as possible, and cooling water supplied to the cooler is correspondingly reduced; and performing control in a predetermined third operation mode, during a rated operation of the pyrolysis reactor, in which the cooling water, the NG, and the off-gas supplied to the cooler are supplied based on a predetermined rated cooling load allocation ratio.

In the performing of control in the first operation mode, only cooling water may be supplied as a refrigerant to the cooler from an initial operation of the cooler until NG is supplied to the burner; and when the burner and the pyrolysis reactor start to be operated by supplying NG to the burner, cooling water and NG may be supplied to the cooler to perform cooling.

When purity of hydrogen extracted by the PSA is determined to be an appropriate level and a load adjustment operation of the pyrolysis reactor is possible while performing the control in the second operation mode, the operation mode is switched to the third operation mode by gradually performing a process of reducing a flow rate of cooling water supplied to the cooler and increasing a flow rate of NG supplied to the cooler such that the rated cooling load allocation ratio is reached.

The rated cooling load allocation ratio may be configured such that 60% is allocated to cooling water, 30% is allocated to an off-gas, and 10% is allocated to NG.

According to the present disclosure, during a process of compressing NG and supplying the same to a pyrolysis reactor, heat generated as a result of compressing the NG may be used more efficiently, thereby reducing the flow rate of NG supplied to a burner, and improving the overall process efficiency of the NG pyrolysis system.

BRIEF DESCRIPTION OF THE DRAWINGS

The above and other aspects, features and advantages of the present disclosure will be more apparent from the following detailed description taken in conjunction with the accompanying drawings, in which:

FIG. 4 is a table in which operation modes usable for a NG pyrolysis system control method according to the present disclosure are arranged.

DETAILED DESCRIPTION

Figure 1:
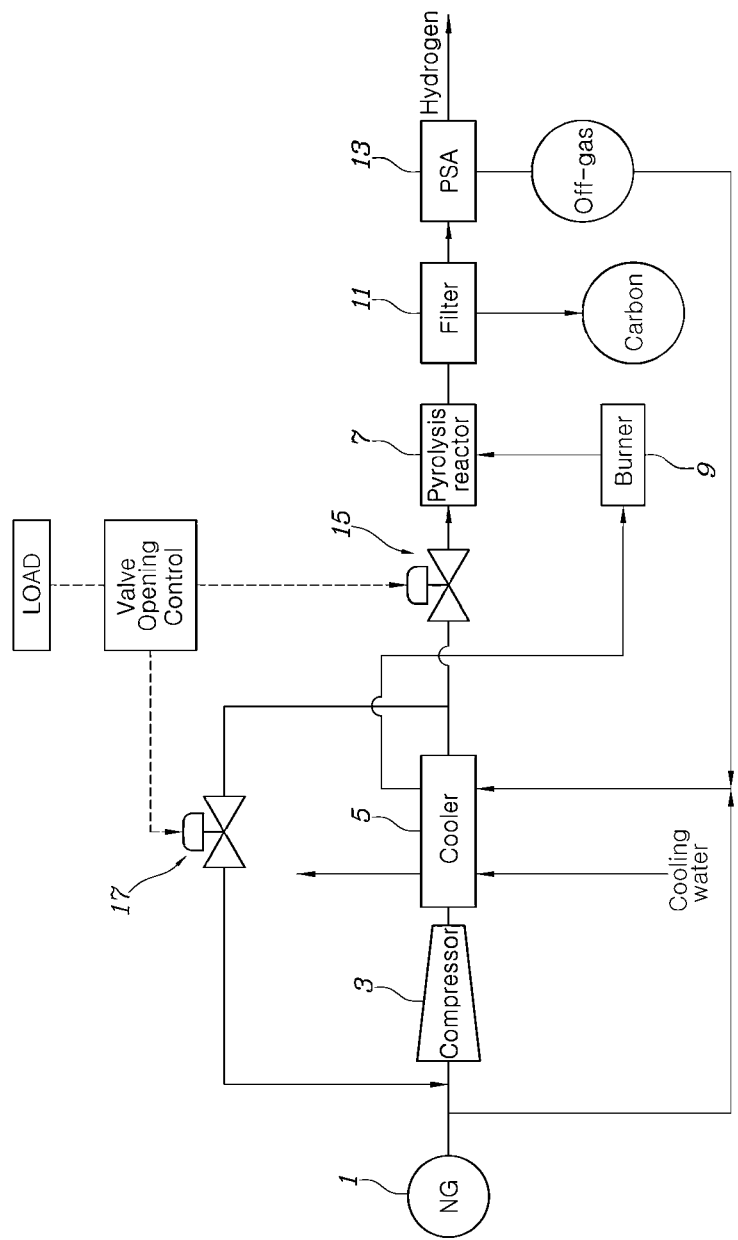
FIG. 1 is a view of the entire configuration of a NG pyrolysis system to which the present disclosure is applied.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component there between. The other expressions of describing a relation between structural elements, i.e. "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. The same or like reference signs presented in the drawings designate the same or like elements.

FIG. 1 is a view of the configuration of a NG pyrolysis system to which the present disclosure is applied. The NG pyrolysis system is configured such that: natural gas (NG) supplied from a NG supply source 1 is compressed in a compressor 3, is cooled while passing through a cooler 5 to a predetermined temperature, and is supplied to a pyrolysis reactor 7; the pyrolysis reactor 7 receives heat supplied by a burner 9 to generate a synthesis gas through a pyrolysis reaction; and the synthesis gas is transferred via a filter 11 to a pressure swing adsorption (PSA) 13, and then high-purity hydrogen is adsorbed and extracted, and the rest thereof is supplied as an off-gas to the burner 9 and combusted by the burner 9.

NG supplied from the NG supply source 1, in addition to the off-gas, is used as a fuel for the burner 9, so that the burner 9 can stably operate even when an off-gas is not generated or is insufficient.

Therefore, an off-gas and NG supplied to the burner 9 are called a "fuel gas", and the off-gas implies a gas which remains after extracting hydrogen from the synthesis gas generated in the pyrolysis reactor 7.

Further, a part of NG supplied to the pyrolysis reactor 7 via the cooler 5 is provided to be circulated to the front end of the compressor 3 by a load of the pyrolysis reactor 7, and a first valve 15 and a second valve 17 are configured to control, based on a load, NG to be supplied to the pyrolysis reactor 7 and NG to be circulated.

Figure 2:
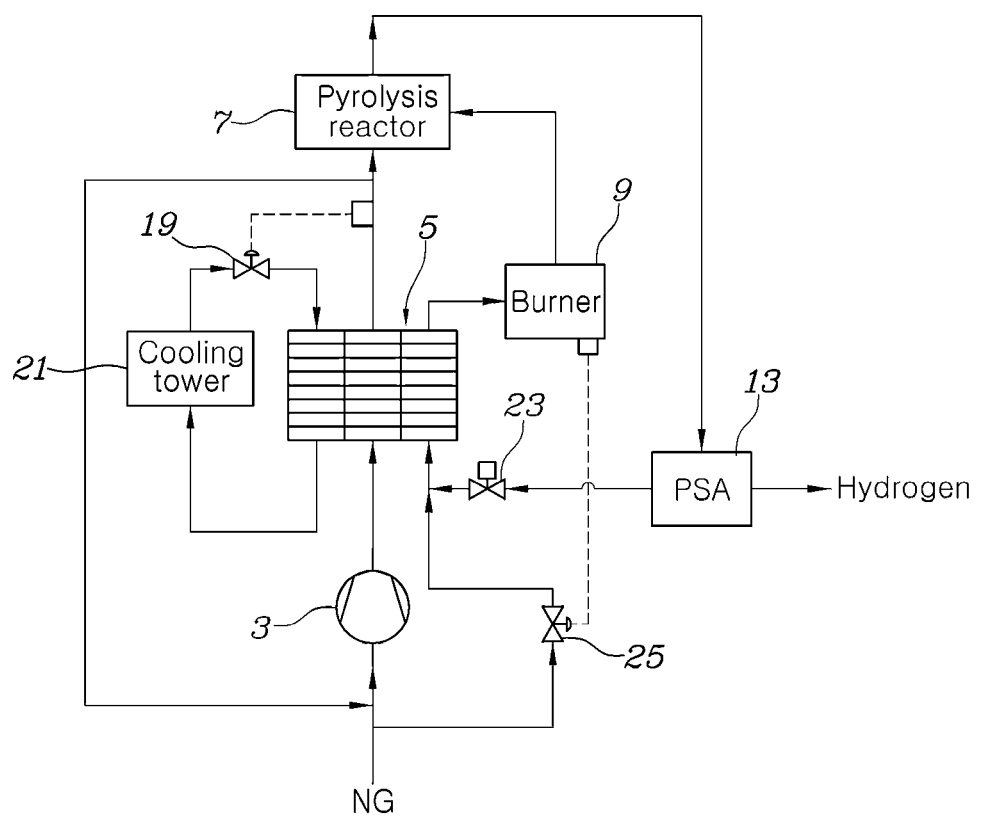
FIG. 2 illustrates major elements of a NG pyrolysis system according to the present disclosure.

FIG. 2 more specifically illustrates the cooler 5 and components thereraround in FIG. 1. A specific embodiment of the NG pyrolysis system of the present disclosure will be described below with reference to FIG. 2.

Referring to FIG. 2, an embodiment of the NG pyrolysis system of the present disclosure includes: a cooler 5 installed to cool NG supplied from the compressor 3 to a pyrolysis reactor 7 and configured to independently use multiple refrigerants; a first refrigerant supply device provided to supply a first refrigerant for the cooler 5; and a second refrigerant supply device configured to supply, to the cooler 5, a fuel gas for the burner 9, including an off-gas and NG which has not passed through the compressor 3, as a second refrigerant for the cooler 5.

The first refrigerant supply device may include: a cooling water valve 19 provided to supply cooling water to the cooler 5; and a cooling tower 21 configured to dissipate heat of the cooling water that has passed through the cooler 5.

The second refrigerant supply device may include: an off-gas valve 23 provided to supply, to the cooler 5, an off-gas incidentally discharged from a PSA 13 configured to adsorb and extract hydrogen from a synthesis gas reacted in the pyrolysis reactor 7; and a NG valve 25 provided to supply, to the cooler 5, NG which is supplied from a NG supply source 1 and does not pass through the compressor 3.

That is, the cooler 5 of the present disclosure is configured to cool, using multiple refrigerants, NG supplied from the compressor 3 to the pyrolysis reactor 7, wherein the cooling water and the fuel gas are used as the multiple refrigerants.

The cooling water valve 19 may be configured to feed back the temperature of NG, which passes through the compressor 3 and is supplied to the pyrolysis reactor 7, to adjust the flow rate of cooling water. The cooling water valve 19 may be formed as an automatic adjustment valve, which may be a hardware device implemented by various electronic circuits, e.g., processor, to transmit and receive signals via wireless or wired connections, that, when executed, adjusts the flow rate of the cooling water.

Substantially, the temperature of the NG supplied to the pyrolysis reactor 7 remains constant at about 60° C., and the first refrigerant supply device using the cooling water as a refrigerant may be preferably configured to provide 100% of cooling capacity required to cool the NG supplied to the pyrolysis reactor 7.

An off-gas and NG, which have passed through the cooler 5, are fuel gases, and are configured to be supplied as a fuel for the burner 9.

Therefore, the fuel gases may absorb, while passing through the cooler 5, heat from NG flowing from the compressor 3 toward the pyrolysis reactor 7 and have an increased enthalpy, whereas an operation is required to be performed while the temperature of gas at a combustor outlet of the burner 9 remains constant, and thus the amount of supply of a fuel may be reduced. Ultimately, it is possible to improve heat efficiency of a NG pyrolysis action in which the pyrolysis reactor 7 produces hydrogen through a pyrolysis reaction.

The NG valve 25 is configured to feed back the temperature inside the burner 9 to adjust the flow rate of NG supplied to the cooler 5. The NG valve 25 may be formed as an automatic adjustment valve, which may be a hardware device implemented by various electronic circuits, e.g., processor, to transmit and receive signals via wireless or wired connections, that, when executed, adjusts the flow rate of the NG.

That is, in the present embodiment, the off-gas valve 23 is an on-off type, and is configured to supply, when an off-gas is generated, the total amount of the off-gas as a fuel gas for the burner 9 through the cooler 5, and the NG valve 25, as described above, performs feedback control based on the temperature inside the burner 9. Therefore, the temperature of the burner 9 can be stably maintained and the use of NG can be reduced as much as possible.

Figure 3:
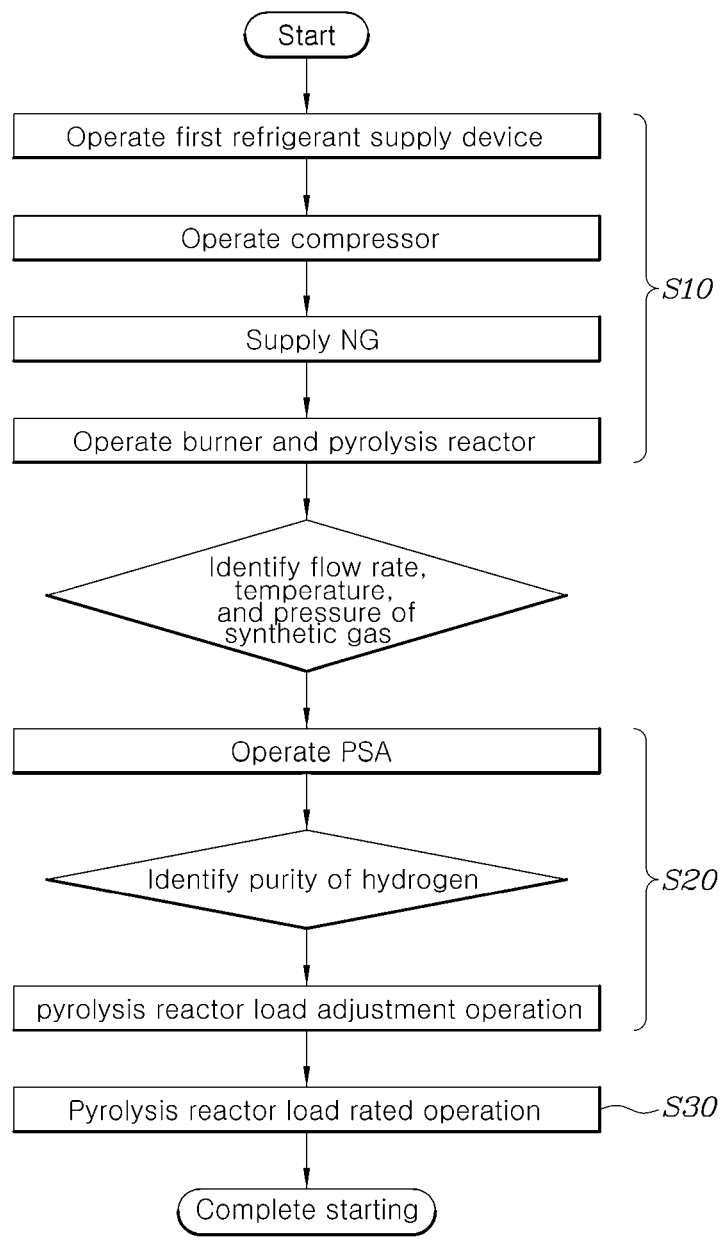
FIG. 3 is a flowchart illustrating an embodiment of a NG pyrolysis system control method according to the present disclosure.

Referring to FIGS. 3 and 4, the NG pyrolysis system control method of the present disclosure includes: when starting the NG pyrolysis system, a step (S10) of performing control in a predetermined first operation mode in which only cooling water and NG are supplied as a refrigerant for cooling the cooler 5 until the burner 9 and the pyrolysis reactor 7 operate and the PSA 13 starts to discharge an off-gas; a step (S20) of performing control in a predetermined second operation mode in which, when the PSA 13 starts to discharge the off-gas, the off-gas is supplied to the cooler 5 as much as possible, and cooling water supplied to the cooler 5 is correspondingly reduced by the cooling water valve 19; and a step (S30) of performing control in a predetermined third operation mode in which, during a rated operation of the pyrolysis reactor 7, the cooling water, the NG, and the off-gas supplied to the cooler 5 are supplied by automatic adjustment valves, which may be hardware devices implemented by various electronic circuits, e.g., processors, to transmit and receive signals via wireless or wired connections, that, when executed control the amounts of cooling water, NG and off-gas supplied to the cooler 5 based on a predetermined rated cooling load allocation ratio.

FIG. 3 illustrates a process of starting the NG pyrolysis system in order. The first refrigerant supply device starts to supply cooling water to the cooler 5 in order to operate the cooler 5, the compressor 3 operates to supply NG from the NG supply source 1, the compressed NG is cooled and supplied to the pyrolysis reactor 7, and the burner 9 is driven to allow the pyrolysis reactor 7 to operate.

At this time, an off-gas has not yet produced, and thus a refrigerant supplied to the cooler 5 includes only the cooling water and NG directly supplied from the NG supply source 1 without passing through the compressor 3. Therefore, as shown in FIG. 4, control is performed in the first operation mode in which 96% of the cooling load of the cooler 5 is allocated to the cooling water, and 4% is allocated to the NG.

In the step of performing control in the first operation mode, only cooling water is supplied as a refrigerant to the cooler 5 from the initial operation of the cooler 5 until NG is supplied to the burner 9; and when the burner 9 and the pyrolysis reactor 7 start to be operated by supplying the NG to the burner 9, cooling water and NG are supplied to the cooler 5 to perform cooling.

Then, the flow rate, temperature, and pressure of a synthesis gas generated in the pyrolysis reactor 7 are checked by an instrument therein, which may be hardware devices implemented by various electronic circuits, e.g., processors, to transmit and receive signals via wireless or wired connections, that, when executed checks the flow rate, temperature, and pressure of the synthetic gas. When each of the flow rate, temperature, and pressure of the synthesis gas reaches a level suitable for producing hydrogen, the PSA 13 is operated to extract hydrogen from the synthesis gas and start to produce the rest thereof as an off-gas.

When the off-gas starts to be produced as described above, the off-gas valve 23 is 100% opened such that if possible, the total amount of the produced off-gas is supplied as a fuel gas to the burner 9 via the cooler 5, and thus a cooling load to be allocated to the first refrigerant supply device is reduced. Therefore, control is performed in the second operation mode in which the cooling water valve 19 is controlled to reduce the flow rate of cooling water supplied to the cooler 5.

For reference, each of percentages inside parentheses in FIG. 4 implies an allocated cooling load among the total cooling load of the cooler 5, and percentages outside the parentheses imply the degree of opening of corresponding valves.

When, during the step (S20) of performing control in the second operation mode, the purity of hydrogen extracted by the PSA 13 is determined to be an appropriate level and a load adjustment operation of the pyrolysis reactor 7 is possible, the operation mode is switched to the third operation mode by gradually performing, for the rated cooling load allocation ratio, a process of reducing the flow rate of cooling water supplied to the cooler 5 and increasing the flow rate of NG supplied to the cooler.

In the present embodiment, the rated cooling load allocation ratio is configured such that 60% is allocated to cooling water, 40% is allocated to an off-gas, and 10% is allocated to NG, but this may be changed depending on a corresponding NG pyrolysis system.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A natural gas pyrolysis system comprising:
   a cooler installed to cool NG supplied from a compressor to a pyrolysis reactor and configured to independently use multiple refrigerants;
   a first refrigerant supply device configured to supply a first refrigerant for the cooler; and
   a second refrigerant supply device configured to supply, to the cooler, a fuel gas for a burner, comprising an off-gas and/or NG which has not passed through the compressor, as a second refrigerant for the cooler.

2. The NG pyrolysis system of claim 1, wherein the first refrigerant supply device comprises:

a cooling water valve configured to supply cooling water to the cooler; and a cooling tower configured to dissipate heat from the cooling water that has passed through the cooler.

3. The NG pyrolysis system of claim 2, wherein the cooling water valve is configured to feed back a temperature of NG, which passes through the compressor and is supplied to the pyrolysis reactor, to adjust a flow rate of cooling water.

4. The NG pyrolysis system of claim 1, wherein the second refrigerant supply device comprises:

an off-gas valve configured to supply, to the cooler, an off-gas discharged from a PSA configured to adsorb and extract only hydrogen from a synthesis gas reacted in the pyrolysis reactor; and a NG valve configured to supply, to the cooler, NG which is supplied from a NG supply source and does not pass through the compressor.

5. The NG pyrolysis system of claim 4, wherein an off-gas and/or NG, which have passed through the cooler, are configured to be supplied as a fuel for the burner.

6. The NG pyrolysis system of claim 4, wherein the NG valve is configured to feed back a temperature inside the burner to adjust a flow rate of NG supplied to the cooler.

7. A NG pyrolysis system control method comprising:

performing control in a predetermined first operation mode, when starting a NG pyrolysis system, in which only cooling water and NG are supplied as a refrigerant for cooling a cooler until a burner and a pyrolysis reactor operate and a pressure swing absorption (PSA) starts to discharge an off-gas;

performing control in a predetermined second operation mode, when the PSA starts to discharge the off-gas, in which the off-gas is supplied to the cooler as much as possible, and cooling water supplied to the cooler is correspondingly reduced; and performing control in a predetermined third operation mode, during a rated operation of the pyrolysis reactor, in which the cooling water, the NG, and the off-gas supplied to the cooler are supplied based on a predetermined rated cooling load allocation ratio.

8. The NG pyrolysis system control method of claim 7, wherein, in the performing of control in the first operation mode, only cooling water is supplied as a refrigerant to the cooler from an initial operation of the cooler until NG is supplied to the burner; and when the burner and the pyrolysis reactor start to be operated by supplying NG to the burner, cooling water and NG are supplied to the cooler to perform cooling.

9. The NG pyrolysis system control method of claim 7, wherein when purity of hydrogen extracted by the PSA is determined to be an appropriate level and a load adjustment operation of the pyrolysis reactor is possible while performing the control in the second operation mode, the operation mode is switched to the third operation mode by gradually performing a process of reducing a flow rate of cooling water supplied to the cooler and increasing a flow rate of NG supplied to the cooler such that the rated cooling load allocation ratio is reached.

10. The NG pyrolysis system control method of claim 7, wherein the rated cooling load allocation ratio is configured such that 60% is allocated to cooling water, 30% is allocated to an off-gas, and 10% is allocated to NG.

* * * * *